United States Patent [19]

Cyr

[11] Patent Number: 5,556,085
[45] Date of Patent: Sep. 17, 1996

[54] WORK HOLDER FOR EYEGLASSES

[76] Inventor: Adelard N. Cyr, 16 Dunrobin La., Watertown, Conn. 06795

[21] Appl. No.: 505,460

[22] Filed: Jul. 21, 1995

[51] Int. Cl.6 ...................................................... B25B 1/00
[52] U.S. Cl. ........................... 269/75; 269/156; 269/242; 269/258; 269/268; 269/270; 269/902; 269/909; 279/110
[58] Field of Search .............................. 269/156, 75, 242, 269/258, 268, 270, 902, 909; 279/110, 112, 106; 451/384

[56] References Cited

U.S. PATENT DOCUMENTS

| 314,610 | 3/1885 | Schmidt. | |
|---|---|---|---|
| 2,471,103 | 5/1949 | Franks et al.. | |
| 2,552,094 | 5/1951 | Hamon et al.. | |
| 3,606,364 | 9/1971 | Benjamin et al. | 279/110 |
| 3,617,046 | 11/1971 | Sotonyl. | |
| 3,622,144 | 11/1971 | Kotting. | |
| 3,667,634 | 6/1972 | Potterat. | |
| 3,841,647 | 10/1974 | Cooper | 279/110 |
| 4,049,254 | 9/1977 | Godot. | |
| 4,821,393 | 4/1989 | Spignelli | 269/242 |
| 4,828,276 | 5/1989 | Link et al. | 279/110 |
| 4,834,354 | 5/1989 | Yang | 269/156 |
| 5,137,263 | 8/1992 | Savoie et al. | 269/156 |
| 5,350,163 | 9/1994 | Lichtenberg | 269/156 |
| 5,363,532 | 11/1994 | Sargent | 269/243 |

Primary Examiner—Robert C. Watson
Attorney, Agent, or Firm—Dallett Hoopes

[57] ABSTRACT

Work holder comprising a first adjustable jaw having spaced holding surfaces thereon and a second jaw comprising a pair of arms pivoted in the housing and having holding surfaces on their distal ends, the arms adapted to be drawn together by a threaded adjustment rod having right-hand and left-hand portions. The housing is swivelly positioned on a suitable weighted base.

6 Claims, 3 Drawing Sheets 5,556,085

WORK HOLDER FOR EYEGLASSES

FIELD OF THE INVENTION

This invention relates to a work holder for eyeglasses, particularly of the two-lens wire-frame type, for servicing on the lens, frame and temple. More specifically, this invention relates to an eyeglasses work holder which firmly grips the eyeglasses by a single lens frame and which comprises only two clamping adjustments.

BACKGROUND OF THE INVENTION

The prior art includes a number of eyeglasses holders which grip the eyeglasses by clamping means so that the eyeglasses can be worked on or the lenses subject to testing or measurement. An example is the U.S. Pat. No. 3,622,144 issued Nov. 23, 1971 to Kotting wherein a first jaw having a first adjustment engages the top of the frame over both lenses, and the bottom of the frame is engaged by separate L-shaped elements pivoted one for each lens on a second adjustment. U.S. Pat. No. 3,617,046 issued Nov. 2, 1971 discloses a plate having mounted thereon four separate spring-pressed rams which engage the perimeter of the frame of a single lens. U.S. Pat. No. 4,049,254 issued to Godot Sep. 20, 1977 discloses a base on which sliding clamps are mounted to move toward the eyeglasses frame from different directions and be fixed once they engage it.

The Sargent U.S. Pat. No. 5,363,532 which issued Nov. 15, 1994 is an eyeglasses holder for washing glasses. Here clamping members may engage the eyeglasses frame from above and below. A nose post stabilizes the glasses during the clamping.

With the present popularity of wire-type eyeglass frames, there is an increasing need for a work holder which is readily and quickly clampable on the frame with a minimum of adjustment steps and at the same time can hold the frame in a way which secures it yet makes the pivoting elements between the frame and temple readily accessible for work. The present invention is directed to such a need.

SUMMARY OF THE INVENTION

The present invention is an eyeglasses work holder comprising a housing including a first adjustable jaw having spaced frame-engaging surfaces thereon and a second jaw mounted on a pair of arms pivoted in the housing and adapted to be drawn together by a rod having right-hand and left-hand threaded portions. The arms have at their distal ends frame-engaging surfaces which are adapted to engage clampingly the bottom of the eyeglasses frame irrespective of the shape of the frame. The holder engages the frame surrounding a single lens and comprises only two adjustments: one for the first jaw moving it up or down and a second for the second jaw moving its components arcuate fashion toward the center of the lens.

BRIEF DESCRIPTION OF THE DRAWINGS

Further objects and features of the invention will be apparent to those skilled in the art from a study of the following specification and the accompanying drawings, all of which disclose a non-limiting embodiment of the invention. In the drawings.

DESCRIPTION THE PREFERRED EMBODIMENTS

Figure 1:
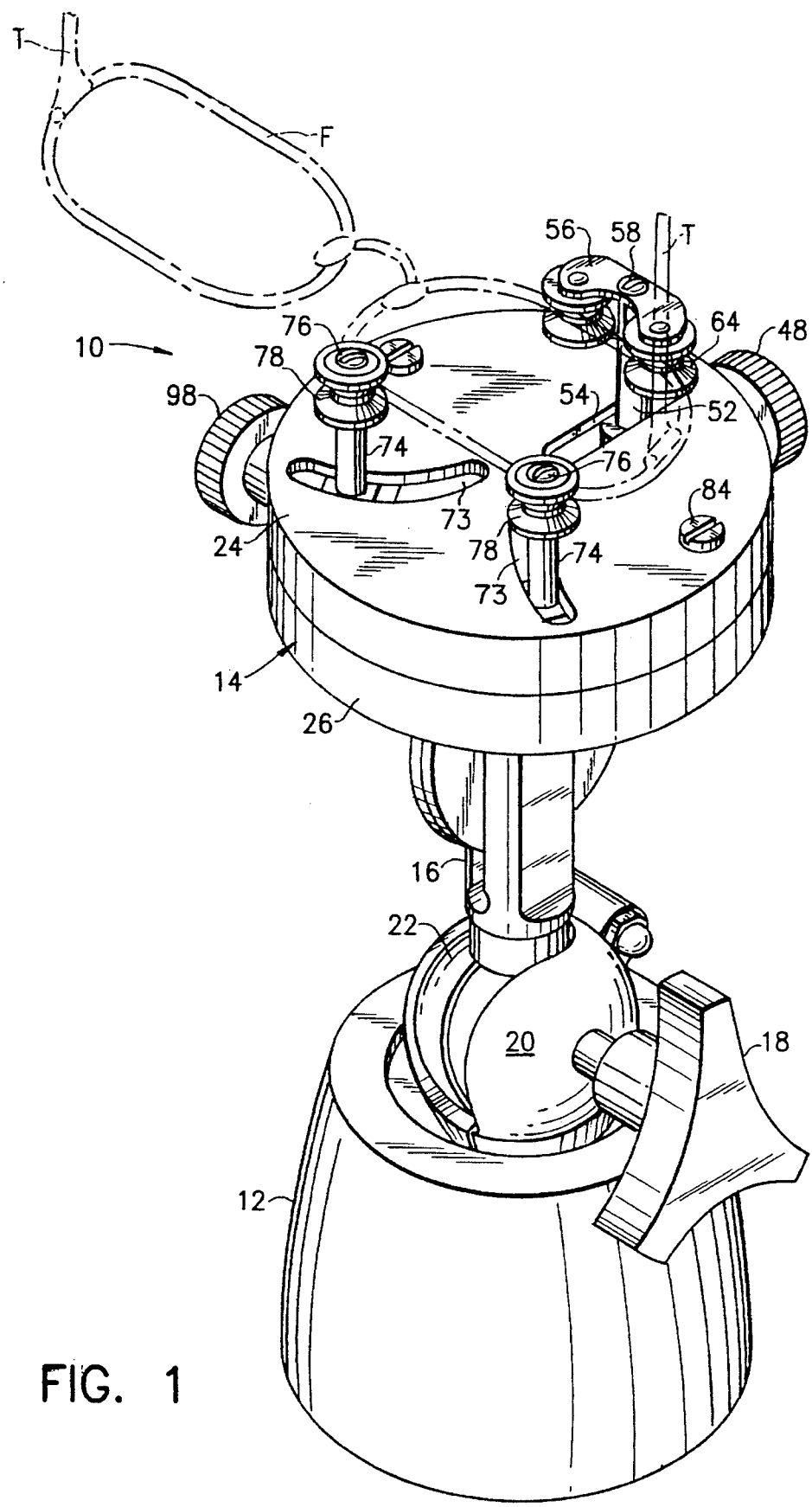
FIG. 1 is a perspective view of the work holder of the invention with its jaws closed on the frame of one of the lenses.
Figure 2:
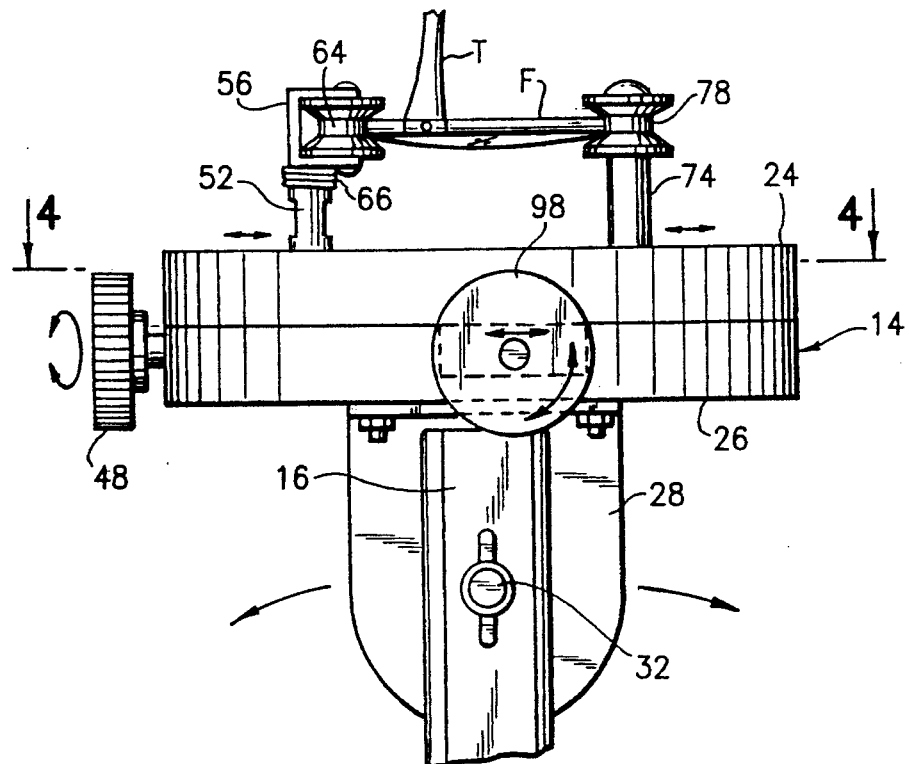
FIG. 2 is a fragmentary front elevational view.

A work holder for eyeglasses embodying the invention is generally designated 10 in FIG. 1. It comprises a weighted base 12 on which is swivelly mounted a clamp 14.

The weighted base 12 is an off-the-shelf commercially available item, for example, sold under the trademark "PANAVISE" and covered by U.S. Pat. No. 2,898,068. The structure, as detailed in the aforesaid patent, is such to permit a wide range of motion to its supporting stem 16. For instance, when the lock 18 is backed off, the stem 16 can freely rotate with respect to the socket 20; can tilt from vertical to horizontal in the slot 22 and, when tilted, can arc about as the socket 20 rotates in the base.

Figure 3:
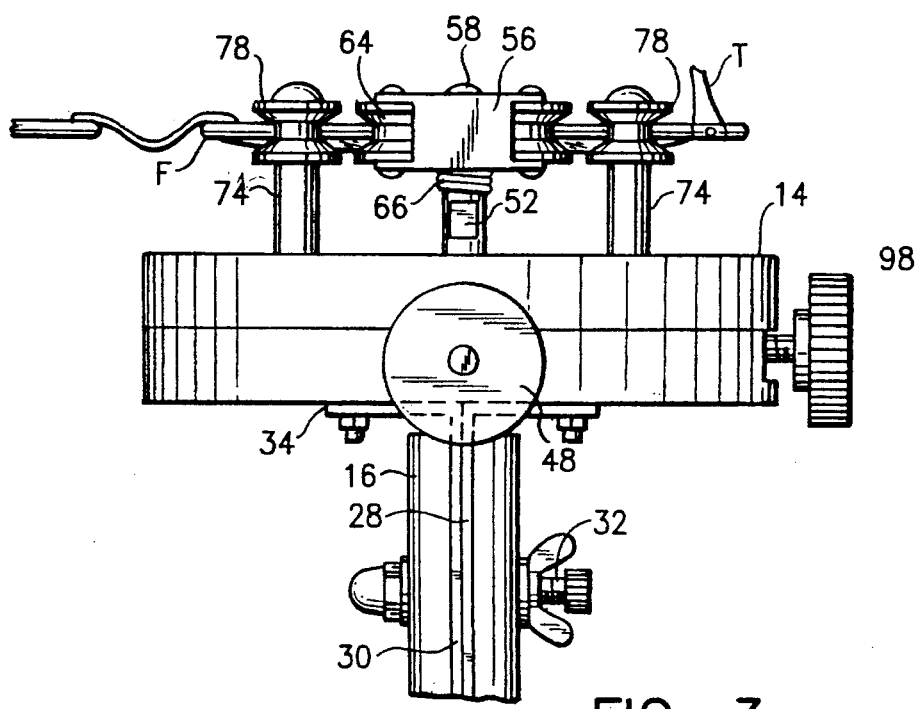
FIG. 3 is a fragmentary side elevational view.

Returning to the description of the invention, the clamp comprises a two-piece housing 24, 26 which is mounted on stem 16 comprising, as shown, a pair of back-to-back brackets, the vertical flanges 28 of which are juxtaposed (FIG. 3) into a vertical tongue, the tongue fitting into a slot 30 in the stem 16. Aligned openings in the tongue 28 and the stem 30 are pinned together by a closing clamp bolt 32 having a wing nut for fixing the attitude of the clamp 14. The horizontal flanges 34 of the brackets are bolted to the housing 24, 26 as shown.

The housing 24, 26 by virtue of the structure of the base 12 and the stem arrangement 16, 28 34 may be made to firmly assume any planar position, horizontal or tilted. The housing is best left in a position convenient to the user.

The housing mounts within it (FIG. 4), a first jaw driving assembly 40 which is in a cavity 42 formed between the two housing parts 24, 26. It includes at opposite ends of the cavity 42 parallel spaced journal plates 44. Freely journaled in the spaced plates 44 is the first jaw rod 26 which is threaded intermediate the plates in preferably the right-hand direction and which terminates outwardly the control knob 48. Between the plates 44 the rod 26 is threadedly mated with a first jaw shuttle 50. It has at its upper end a spindle 52 which extends through a slot 54 in the upper housing 24 and keeps the shuttle 50 from turning. Thus, by turning the control knob 48, the spindle 52 moves inward or outward of the clamp.

Figure 7:
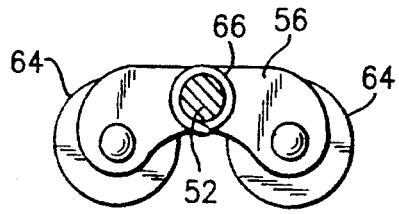
FIG. 7 is a sectional view taken on the line 7—7 of FIG. 6.
Figure 6:
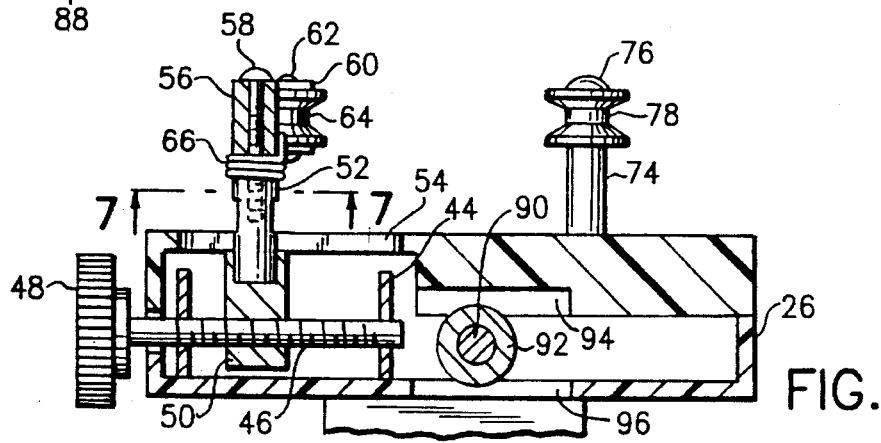
FIG. 6 is a fragmentary view taken on the line 6—6 of FIG. 4.

Pivotally mounted in its center on a pin 58 on the spindle 52 is a yoke 56 (FIG. 7) which has on its outward ends vertically spaced ears 60 respectively. Each pair of ears has a vertical axle 62 therebetween, the axles respectively receiving hour-glass-shaped plastic rollers 64 rotatable and swingable with the yoke about the pin 58. Assuring that the yoke assembly as described faces generally the second jaw is an axial spring 66 surrounding the spindle 52 and having one end fixed to the spindle and a second upper end (FIG. 6) disposed against the yoke between the hour-glass-shaped rollers 64.

The second jaw is mounted (FIG. 4) on a pair of arms 70 which are pivoted respectively by spaced fulcrums 72 to the housing. From the distal ends of the arms 70 and extending upward through arcuate slots 73 in the housing part 24 are spindles 74. At the upper ends of the spindles 74 are mounted pins 76. The pins 76 respectively rotatably carry hour-glass-shaped rollers 78, also of plastic.

Figure 5:
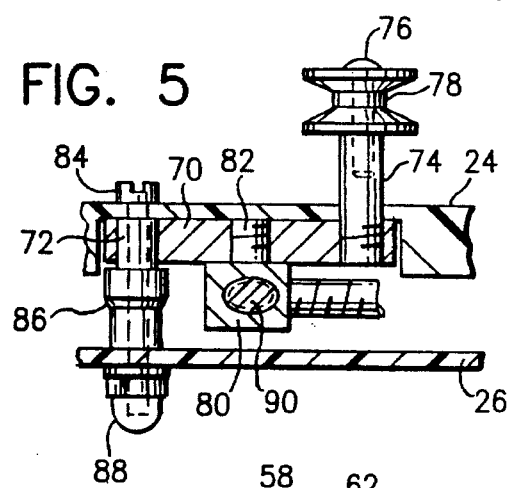
FIG. 5 is a fragmentary sectional view taken on the line 5—5 of FIG. 4.

Intermediate the ends of the respective arms 70 are pivoted nuts 80 which are swively secured to the arms 70 by bosses 82 received in apertures in the respective arms 70. The bosses keep the nuts 80 from turning. As shown in FIG. 5, the fulcrums 72 which pivot the arms 70 respectively to the housing may comprise a threaded fastener 84 surrounded by spacing collars 86 and terminal nuts 88 for securing together the two parts 24, 26 of the housing.

Figure 4:
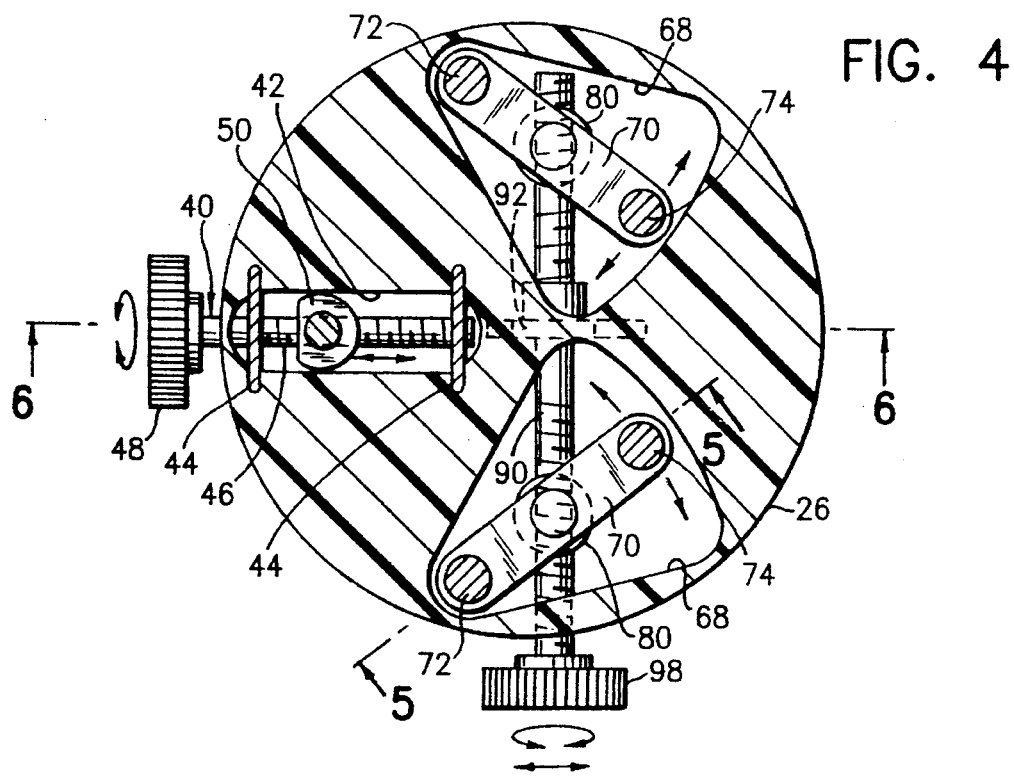
FIG. 4 is a sectional view taken on the line 4—4 of FIG. 2.

The nuts 80 receive in threaded engagement a rotatable threaded rod 90 having a central annular flange 92 fixed thereto and adapted to working in retaining slots 94, 96 of the housing parts (FIG. 6) to center the threaded rod 90 in the clamp. Threaded rod 90 as shown in FIG. 4 extends through the housing half 26 and terminates in a control knob 98. On opposite sides of the annular flange 92 the rod 90 is threaded in opposite senses respectively (one side right-hand, one side left-hand) and the nuts 80 which engage the rod are threaded respectively in opposite senses. As a result, as the control knob 98 is turned one way or the other, the ends of the distal end arms 70 and consequently the second jaw rollers 78 move toward or away from each other and simultaneously on respective arcs toward and away from the first jaw rollers 64.

It can be seen from FIG. 1 that irrespective of the eyeglasses frame shape on which the clamp is to be used, the first and second jaws do an effective job at clamping them. Thus, if the wire frame is circular, the second jaw rollers 78 will engage it with an arc of frame inbetween rollers to immobilize the frame with respect to the clamp 14. If the frames are more triangular and a point of the triangle can be disposed between the two rollers 78 of the second jaw as the control knob 98 is turned, the roller 78 will close in on the frame and securely clamp it.

The operation of the structure described is self-evident. First, lock 18 and nut 32 are loosened and the plane of the clamp housing 24, 26 is selected and then the lock 18 and nut are tightened. Next, with the jaws as wide apart as is practical, the eyeglass frame F is placed against the first jaw rollers 64, the frame engaging in the narrow necks of the rollers. The control knob 48 is then turned to bring the first jaw rollers toward the center of the housing to an appropriate extent which can be determined from experience. Next the second jaw rollers are brought arcuately toward each other and toward the fixed jaw rollers by dialing the control knob 98. When all four rollers firmly engage the frame about the lens, the clamping is complete and the eyeglasses hinge or frame F or temple T may be worked on with both hands.

It will be seen that the present invention offers an advantageous work-holding structure and that may be easily operated. It accommodates to virtually any shape of eyeglasses frame, enabling the operator to have both hands free to work on the ticklish adjustment of the hinge pin, etc.

The invention described here may take a number of forms. It is not limited to the embodiment disclosed but is of a scope defined by the following claim language which may be broadened by an extension of the right to exclude others from making, using or selling the invention as is appropriate under the doctrine of equivalents.

What is claimed is:

1. A work holder for eyeglasses comprising:
   a. a support base,
   b. a clamping head swively mounted on the support base, the head comprising:
      1) a housing,
      2) a first adjustable jaw assembly comprising a first adjustment screw extending laterally into the housing, a first shuttle in the housing and a first clamping jaw extending outward from the shuttle, the screw threadedly received into an opening in the shuttle and held by the housing against axial movement with respect to the housing, the first clamping jaw having spaced first concave holding surfaces thereon,
      3) a second adjustable jaw assembly comprising a pair of arms in the housing, each pivoted at one end in the housing and extending generally away from the first adjustable jaw assembly, the distal ends of the arms carrying a second clamping jaw extending outward from the head comprising spaced second concave holding surfaces, a pair of second shuttles pivoted to the arms respectively intermediate the pivots and distal ends, a second adjustment screw extending laterally into the housing, the second adjustment screw being held by the housing against axial movement, the second adjustment screw having thread portions of opposite sense, the portions being threadedly received into openings in the second shuttles respectively, whereby turning the second adjustment screw in one direction moves the second concave holding surfaces toward each other and toward the first concave holding surfaces, and turning the first adjustment screw in one direction moves the first concave holding surfaces toward the second concave holding surfaces, such movement adapted to have the holding surfaces engage and clampingly support a framed lens of a pair of eyeglasses.

2. A work holder for eyeglasses as claimed in claim 1 wherein the concave holding surfaces are in the form of necked spools.

3. A work holder for eyeglasses as claimed in claim 2 wherein the spools are Nylon.

4. A work holder for eyeglasses as claimed in claim 1 wherein the first shuttle includes a spindle and the spaced first concave holding surfaces are a pair of necked spools carried on a yoke pivoted intermediate the spools to the spindle.

5. A work holder as claimed in claim 4 wherein the spindle is encircled by an axial spring, the ends of which are anchored in the spindle and the yoke respectively to generally stabilize the first jaw in the direction of the second jaw.

6. A work holder for eyeglasses comprising:

a ) a housing, b) a first adjustable jaw assembly comprising a first adjustment screw extending laterally into the housing, a first shuttle in the housing and a first clamping jaw extending outward from the shuttle, the screw threadedly received into an opening in the shuttle and held by the housing against axial movement with respect to the housing, the first clamping jaw having spaced first holding surfaces thereon, and c) a second adjustable jaw assembly comprising a pair of arms in the housing, each pivoted at one end in the housing and extending generally away from the first adjustable jaw assembly, the distal ends of the arms carrying a second clamping jaw extending outward from the head comprising spaced second holding surfaces, a pair of second shuttles pivoted to the arms respectively intermediate the pivots and distal ends, a second adjustment screw extending laterally into the housing, the second adjustment screw being held by the housing against axial movement, the second adjustment screw having thread portions of opposite sense, the portions being threadedly received into openings in the second shuttles respectively.

\* \* \* \* \*